(12) United States Patent
Jensen (10) Patent No.: US 12,312,796 B2
(45) Date of Patent: May 27, 2025

(54) TOPOLOGICALLY ADAPTIVE TOOLPATH GENERATION SYSTEM AND METHOD FOR ADDITIVELY CONSTRUCTING A BUILDING STRUCTURE

(71) Applicant: Icon Technology, Inc., Austin, TX (US)

(72) Inventor: Evan M. Jensen, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 382 days.

(21) Appl. No.: 16/952,802

(22) Filed: Nov. 19, 2020

(65) Prior Publication Data
US 2022/0154443 A1 May 19, 2022

(51) Int. Cl.
| | | |
|---|---|---|
| *B33Y 30/00* | (2015.01) | |
| *B28B 1/00* | (2006.01) | |
| *B29C 64/106* | (2017.01) | |
| *B33Y 10/00* | (2015.01) | |
| *B33Y 50/02* | (2015.01) | |
| *E04B 1/16* | (2006.01) | |

(52) U.S. Cl.
CPC ................ *E04B 1/16* (2013.01); *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 40/00; B33Y 50/00; B33Y 50/02; B28B 1/001; B28B 17/0081; B29C 64/106; B29C 64/188; B29C 64/194; E04B 1/16; G01B 11/24; E04G 21/0436; E04G 21/0463
See application file for complete search history.

(56) References Cited

U.S. PATENT DOCUMENTS

| | | | |
|---|---|---|---|
| 2002/0104973 A1* | 8/2002 | Kerekes | B22F 10/22 250/559.2 |
| 2016/0023403 A1* | 1/2016 | Ramos | B33Y 30/00 425/171 |

(Continued)

FOREIGN PATENT DOCUMENTS

EP 2815872 7/2018

OTHER PUBLICATIONS

Extended European Search Report issued to EP Application No. 21209110.2, dated Apr. 14, 2022, 10 pages.

*Primary Examiner* — Galen H Hauth
*Assistant Examiner* — Baileigh Kate Darnell
(74) *Attorney, Agent, or Firm* — KOKKA & BACKUS, PC (57) ABSTRACT

A system is provided for constructing a building structure, and specifically a wall of the structure, using a toolpath generation system and method to compensate for an uneven or unlevel foundation surface on which the wall is additively formed. The system includes a printing assembly and a mechanism for measuring a three dimensional topology of the surface. A processor is provided to receive a measured topology and to generate one or more sublayers and corresponding sub toolpaths. A nozzle mounted on the printing assembly can then extrude a sublayer bead in select recess or valley portions of the surface and below a subsequently extruded bead placed on high portions of the foundation surface. The sublayer beads compensate for the uneven foundation surface to produce a more even or level ensuing foundation surface using the additive printing process itself.

13 Claims, 8 Drawing Sheets

(56) References Cited

U.S. PATENT DOCUMENTS

| | | | |
|---|---|---|---|
| 2018/0043610 A1* | 2/2018 | LaBossiere | B29C 64/106 |
| 2018/0162011 A1* | 6/2018 | Friend | E02F 9/261 |
| 2018/0169953 A1* | 6/2018 | Matusik | B29C 64/124 |
| 2018/0361729 A1 | 12/2018 | Gibson et al. | |
| 2019/0134891 A1 | 5/2019 | Mamrak et al. | |
| 2019/0134911 A1* | 5/2019 | Jones | B22F 3/164 |
| 2019/0351620 A1* | 11/2019 | Jaiswal | B22F 10/20 |
| 2020/0048893 A1* | 2/2020 | Martinez | E04B 1/3505 |
| 2020/0368970 A1* | 11/2020 | Georgeson | B29C 64/118 |
| 2021/0048292 A1* | 2/2021 | Anwar | B33Y 10/00 |
| 2021/0110603 A1* | 4/2021 | North | G06T 19/20 |

\* cited by examiner

TOPOLOGICALLY ADAPTIVE TOOLPATH GENERATION SYSTEM AND METHOD FOR ADDITIVELY CONSTRUCTING A BUILDING STRUCTURE

BACKGROUND

This disclosure is generally directed to three-dimensional (3D) printing of a building structure. More particularly, this disclosure is directed to 3D printing of stacked layers of extrudable building material to form a wall of the structure using a toolpath generation system and method to compensate for an uneven or unlevel foundation surface on which the wall is additively formed.

A building structure (e.g., building, dwelling, shed, home, etc.) may be manufactured with a multitude of different materials and construction methods. Among the materials commonly used in the construction of a building structure is concrete or cement. For example, cementitious material may be mixed with water and dry ingredients to form interior or exterior walls of the structure.

One mechanism in which to form the structure is through 3D printing. A program can be stored in memory and executable by a processor to drive a printing assembly along a toolpath. Exiting the printing assembly is a bead of extruded cementitious material that is placed along the toolpath. The beads of material are additively placed, one on top of the other, along the toolpath stored in memory. The initial bead is placed upon the foundation surface, and subsequent beads are stacked on that initial bead upward from the foundation surface in a substantially perpendicular direction relative to the upper surface. The foundation surface can be any surface, a popular surface being a concrete slab surface.

Unfortunately, most surfaces on which walls are additively printed are uneven or unlevel. In instances of 3D printing of a structure, the foundation or "print bed" stays with the structure after print. Printing on an engineered slab or uneven ground presents non-level or non-flatness for the initial and subsequent additive layers of beads. Conventional mechanisms attempt to level the bed surface, but when the bed is a concrete slab foundation it is very difficult to modify the slab surface after the concrete slab is poured. It is desirable to provide a system and method using the additive 3D printing process itself to produce a more even or level foundation surface rather than unsuccessfully attempting to level the foundation surface before applying additive 3D printing.

BRIEF SUMMARY OF THE DISCLOSURE

In one embodiment disclosed herein is a system for constructing a building structure. The system include a printing assembly movably disposed on a gantry above a foundation service. A profilometer, encompassing any and all 3D scanning mechanisms and techniques, can be mounted on the printing assembly for measuring a 3D profile of the surface. A processor can be coupled to receive the measure topology and to generate a sublayer from the measured topology. The processor can also generate a sub toolpath extending across at least a portion of the sublayer. A nozzle mounted on the printing assembly can extrude a sublayer bead along only the sub toolpath and below a subsequently extruded layer zero bead placed along a high point of the foundation surface.

The printing assembly operates from software instructions stored in memory. The software instructions are fetched by a processor, for example, to move the printing assembly in three dimensions. The instructions can also instruct the printing assembly to mix a proper amount of water and dry ingredients, and to extrude the resulting material at the proper rate along the toolpath.

The extruded building material appears as a bead along the surface. The initial bead is placed on the foundation surface, and successive beads are stacked one after the other along the toolpath and upon the previous bead. Stacking of beads in succession, and in a direction perpendicular to a foundation surface results in the formation of a wall. A bead will terminate where there is an opening, and resume after that opening to form a doorway or window within the wall. The resulting structure can therefore be a building structure, and the system used to construct that building structure is an additive printing system.

According to another embodiment, a non-transitory memory medium is provided. The memory medium can include a zero level toolpath along which a nozzle arranged on the printing assembly is configured to extrude a zero level bead across a surface. The memory medium can also include a sub toolpath along which the nozzle arranged on the printing assembly is configured to extrude a sublayer bead. The sublayer bead can be one bead layer thickness below the surface on which the zero level bead is to be extruded. The zero level toolpath comprises instructions for moving the nozzle and extruding the zero level bead across the surface. The sub toolpath comprises instructions for moving the nozzle and extruding the sublayer bead across the sublayer before executing instructions for moving the nozzle and extruding the zero level bead across the surface.

According yet to another embodiment, a method is provided for constructing a structure. The method can include scanning a concrete slab surface, and then mapping in three dimensions a topology of that surface. The method further includes applying a spline threshold to the mapped topology to generate a sublayer in two dimensions within the surface and below a high point of the surface. The method further includes first emitting extruded building material sublayer bead partially across the sublayer dimensions, and thereafter second emitting extruded building material zero level bead partially across the surface. The surface comprises the high point. The method can further include repeating the second emitting of subsequent beads stacked directly on top of the zero level bead to form a wall of a structure on the concrete slab surface.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device or component couples to a second component, that connection may be through a direct connection of the two component, or through an indirect connection that is established via other devices, components, nodes, and connections. In addition, as used herein, the terms "axial" and "axially" generally mean along or parallel to a given axis (e.g., x, y or z direction or central axis of a body, outlet or port), while the terms "radial" and "radially" generally mean perpendicular to the given axis. For instance, an axial distance refers to a distance measured along or parallel to the axis, and a radial distance means a distance measured perpendicular to the axis.

As used herein, the terms "about," "approximately," "substantially," "generally," and the like mean plus or minus 10% of the stated value or range. In addition, as used herein, an "extruded building material" refers to a building material that may be delivered or conveyed through a conduit (e.g., such as a flexible conduit) and extruded (e.g., via a nozzle or pipe) in a desired location. In some embodiments, an extruded building material includes a cementitious mixture (e.g., concrete, cement, etc.). Further, as used herein, the term "computing device", "controller" or "processor" refers to any suitable device (or collection of devices) that is configured to execute, store, and/or generate machine readable instructions (e.g., non-transitory machine readable medium). The term may specifically include devices, such as, computers (e.g., personal computers, laptop computers, tablet computers, smartphones, personal data assistants, etc.), servers, clients, etc. A computing device or controller connotes a processor. A processor may include multiple processors and a memory connected to or a part of the processor, wherein the processor is to execute instructions that are stored on the memory.

As previously described above, building structures (e.g., dwellings, buildings, sheds, etc.) may be manufactured with a multitude of different materials and construction methods. Traditionally, a building structure may be constructed upon a composite slab or foundation that comprises concrete reinforced with re-bar or other metallic materials. The structure itself may then be framed (e.g., with wood and/or metal framing members), and then an outer shell and interior coverings (e.g., ply-wood, sheet rock, etc.) may be constructed around the structural framing. Utilities (e.g., water and electrical power delivery as well as vents and ducting for air conditioning and heating systems) may be enclosed within the outer shell and interior covers along with insulation. This method of designing and constructing a building structure is well known and has been successfully utilized in constructing an uncountable number of buildings; however, it requires multiple constructions steps that cannot be performed simultaneously and that often require different skills and trades to complete. As a result, this process for designing and constructing a building can extend over a considerable period (e.g., 6 months to a year or more) and is somewhat labor-intensive. Such a lengthy construction period is not desirable in circumstances that call for the inexpensive construction of a structure in a relatively short period of time.

Accordingly, embodiments disclosed herein include construction systems, methods of construction, and even methods for structure design that allow a building structure to be constructed in a fraction of the time associated with traditional construction methods. In particular, embodiments disclosed herein utilize additive manufacturing techniques (e.g., 3D printing) in order to produce a building more quickly, economically, and in a systematic manner. Three dimensional printing generally involves movement of a printing assembly, and a nozzle outlet of the printing assembly, in three axes of movement across a horizontal surface of a wall structure comprising inner and outer members. The wall structure is therefore built layer-by-layer from the foundation surface upward. The foundation surface can be a ground surface made of road base or gravel rather than concrete in rebar. As the wall is being built, or printed, the nozzle will periodically turn off and extruded building material will cease exiting the outlet to leave openings in the wall for the windows, doors, etc.

Figure 1:
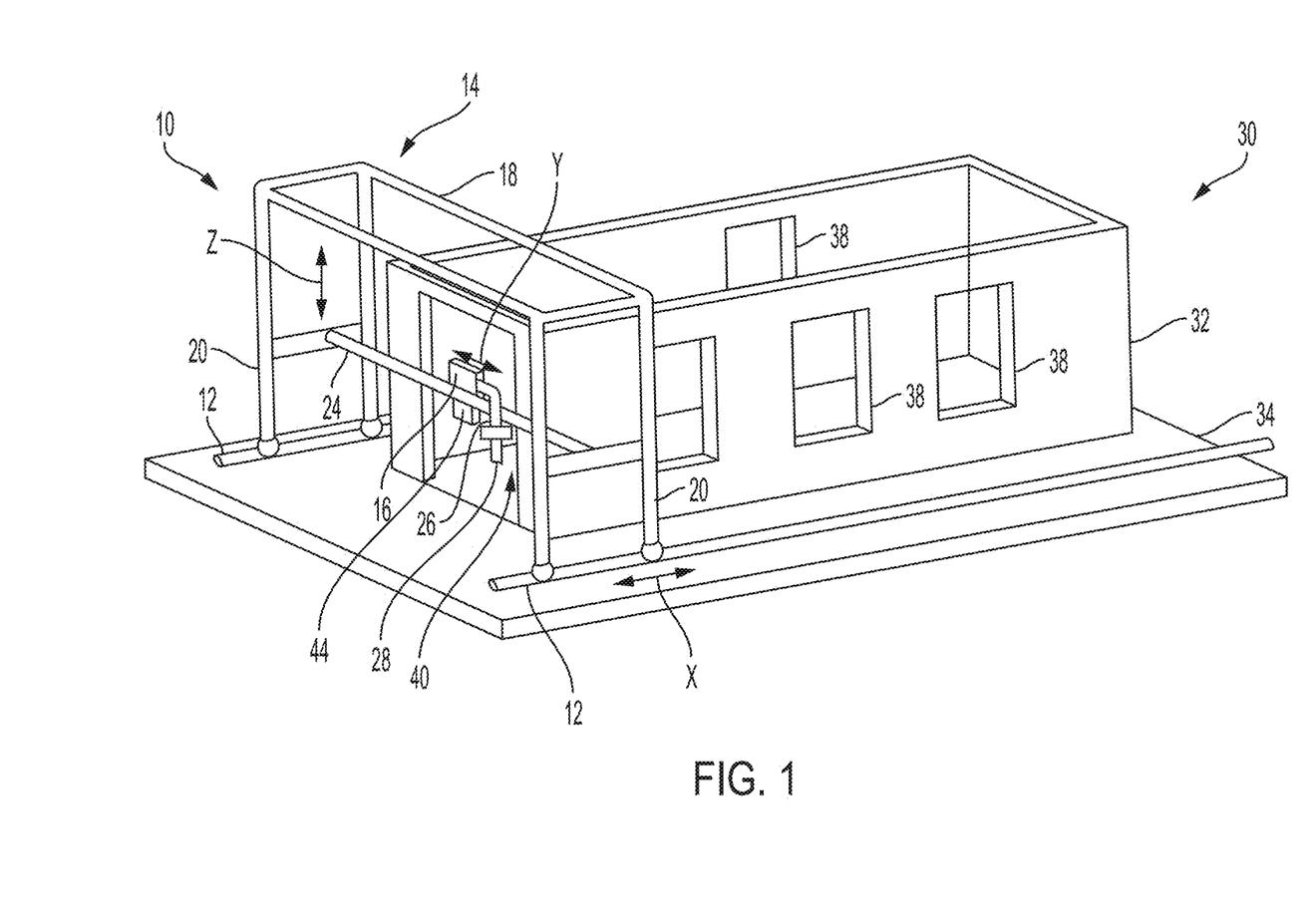
FIG. 1 is a perspective view of a system for 3D additive construction of a structure by producing stacked layers of elongated beads that are printed in succession upon a foundation surface and along a toolpath.

Referring to FIG. 1, a construction system 10 according to one embodiment is shown. Although there are multiple types of 3D additive construction systems contemplated herein, one example of a construction system 10 includes a gantry-type construction system. Construction system 10 can include a pair of railed assemblies 12, a gantry 14 movably disposed on rail assemblies 12, and a printing assembly 16 movably disposed on gantry 14. For example, gantry 14 can include a bridge support 18 connected between a pair of vertical supports 20. Also, coupled between vertical supports can be a trolly bridge 24, on which printing assembly is 16 is movably disposed.

For example, gantry 14 can move in the x-axis or x direction along rail assemblies 12, and printing assembly 16 can move along the y-axis or y direction along trolly bridge 24 of gantry 14. To complete the three orthogonal axes or dimensions of movement for printing assembly 16, trolly bridge 24 can move vertically up and down along the z-axis. For example, trolly bridge 24 can move up and down in the z-axis upon the vertical support members 20. The x-axis is orthogonal to the y-axis and the z-axis, and is orthogonal to the plane formed by the x and y axes. Movement along the x, y and z-axes of printing assembly 16 can occur via drive motors coupled to drive belts, chains, cables, etc. controllably from an instruction-driven processor within a peer system or controller.

Construction system 10 effectuates the construction of a building structure 30 by passing the printing assembly 16 above a wall structure 32 and emitting extruded building material from a nozzle 26 comprising an outlet 28. Accordingly, as printing assembly 16 moves in three possible orthogonal axis, as well as angles therebetween, outlet 28 emits extruded building material onto the upper surface of the wall structure 32 as it is being formed. The wall structure is formed layer-by-layer by laying down an elongated bead of cementitious material (e.g., cement or concrete) beginning with the first layer on ground or a concrete slab foundation 34.

As each layer of elongated beads are laid down onto the foundation 34 surface, or onto a previous layer, a plurality of stacked elongated beads of extruded building material are additively formed in three dimensions, resulting in building structure 30. When the printing assembly 16 and outlet 28 approaches an opening such as a window opening 38 or a door opening 40, the pump for the extruded building material stops, and possibly a valve on nozzle 28 or elsewhere shuts off the flow of extruded material. The flow of extruded building material does not resume until after the outlet 28 moves past the opening, whereupon the wall structure 32 is resumed.

Foundation 34 can be made of concrete with metallic rods (e.g., rebar) within the foundation form. Alternatively, foundation 34 can be ground, possibly packed gravel or crushed rock, etc. Importantly, however, foundation 34 upper surface should be substantially planar at its top surface and of sufficient perimeter size to accommodate 3D printing of walls of structure 30. The axis, labeled as x, y and z are orthogonal axis in three dimensions; however, it is contemplated that printing assembly 16 and thus outlet 28 can move in three dimensions to form a wall structure at various three-dimensional angles that can be but need not be orthogonal angles for the outer and inner wall structures 32. Accordingly, while FIG. 1 shows an outer wall structure 32, it is possible to form an inner wall structure to bifurcate rooms of a building 30 using construction system 10.

A control system, controller, or processor is used for controlling the printing of the extruded beads that form the wall structure 32. The control system, or processor includes or is coupled to memory. An instruction set stored in the memory is used to control the additively placed beads by adding the proper amount of water or liquid mix material from a water tank, and dry ingredients from a hopper. The liquid and dry mix to then stirred or mixed by a mixer. Possibly through a feedback sense mechanism, controller can adjust the mix of the concrete material and thus the proper proportions of water (or liquid) to dry material, and supply that proper mix to a supply tank.

It is desirable for the stacked elongated beads to be at the proper cross-sectional dimension which is approximately 2.5 inches in lateral width (i.e. parallel to the horizontal plane) and approximately 1 to 1.5 inches tall. (i.e. perpendicular to the horizontal plane). The horizontal plane is preferably along a plane formed by the x and y axes, and the orthogonal dimension thereto is preferably along the z-axis or dimension. To maintain the proper cross-sectional dimension in the horizontal plane so that when the elongated beads are stacked, the inner and outer surfaces are relatively even in texture and somewhat smooth. A pump can be used to supply the proper volume of extruded material to supplement the proper viscosity from a mixer. A controller, or processor, controls not only the proper flow and viscosity of the elongated bead as it is being printed, one on top of the other, but the processor also controls movement of the printing assembly 16 in the x, y and z dimensions via corresponding electrically driven drivers. The driver can be a motor coupled to any drive mechanism that moves the corresponding trolly bridge 24, gantry 14 and printing assembly 16 on the trolly bridge 24 according to the instruction CAD layout, and to the proper speed, established by the instructions stored in the memory.

Connected to trolly bridge 24, and thus to gantry 14, can be a profilometer 44. Profilometer 44 is a measuring instrument used primarily to measure a surface profile. Profilometer 44 measures the profile in three dimensions in order to quantify the roughness, levelness, or unevenness of the upper somewhat planar surface. Critical dimensions, such as step, curvature, flatness, etc. are computed from the surface topography. In particular, the surface topography of a foundation 34 surface is detected by profilometer 44 by sweeping profilometer 44 along the x and y dimensions, or in a grid pattern. As profilometer 44 is swept in two dimensions, a third dimension is read at various points along the two-dimensions. A 3D point cloud mapping is therefore undertaken using profilometer 44 placed on, for example, a gantry 14 of a movable trolley bridge 24 so as to scan at least part of if not all of the foundation surface.

Figure 2:
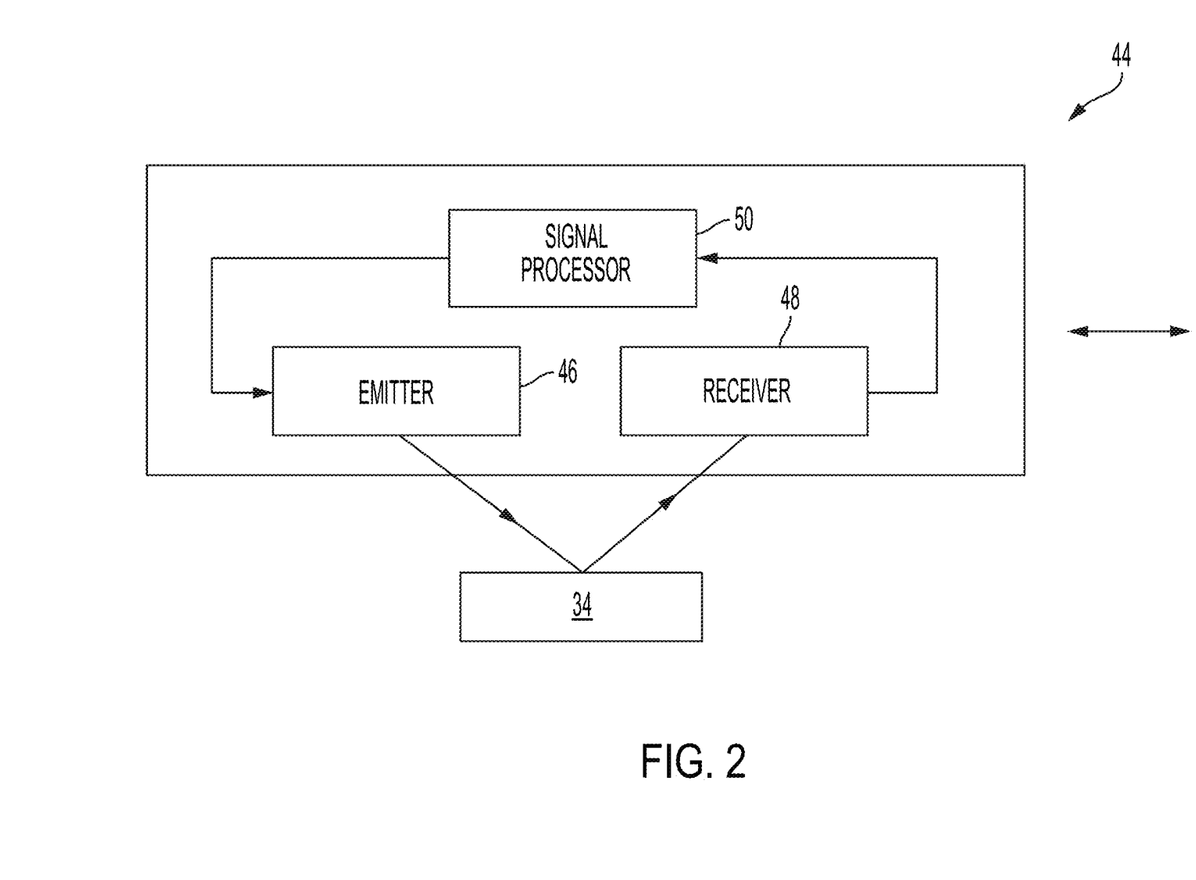
FIG. 2 is a block diagram of a profilometer mounted on the additive construction apparatus for detecting the foundation surface topology.

Turning now to FIG. 2, further details of a profilometer 44 is shown according to one example. Although is contemplated that a profilometer can be a contact profilometer such as a stylus placed or scanned across the surface or, alternatively, a non-contact profilometer such as an optical profilometer. An optical profilometer uses interferometry based methodologies to determine a 3D point cloud data. Alternatively, profilometer 44 uses ranging and triangulation based on reflection from the 3D profile surface. Optical profilometer can include an emitter 46 of an optical signal. According to one example, emitter 46 can be a laser that emits a scanning laser line configured as a two-dimensional laser line scanner that, when moved along an axis, scans a three-dimensional profile.

Profilometer 44 can include a laser beam used for measuring distance (ranging) by illuminating the target surface with laser light and measuring the reflection with the receiver/sensor 48. Differences in laser return times and wavelengths can then be used to make a digital 3D representation of the surface. A common technique of light detection and ranging is used to make high resolution maps of the surface. 3D scanning can occur by moving the emitter 46 in two, and possibly three, dimensions. Alternatively, the emitter 46 can be moved in one dimension while moving the gantry or trolly bridge in two dimensions. During operations, a controller or processor moves the scanner or profilometer 44 along a pre-determined path in unison with the gantry 14 or trolley bridge 24. As profilometer 44 moves in one or two-dimensions, the emitter 46 output is reflected from surface 34 onto receiver 48. Reflections from surface 34 are therefore sensed by the optical receiver 48. Optical receiver 48 can be, for example, a camera. Emitter 46 and receiver 48 comprised data ports or channels to allow for control of the emitted wave form, or ray, and reporting from the receiver 48. There can be one signal processor 50 for each profilometer 44. Alternatively, the receiver 48 output from each profilometer 44 can be linked across profilometers to allow use of only a single signal processor 50 across multiple profilometers 44, if desired. Accordingly, there may be multiple profilometers 44 connected to trolley bridge 24, if desired. Each profilometer 44 thereby scans a certain portion of surface 34, with other profilometers scanning other portions simultaneous to each other.

Figure 3:
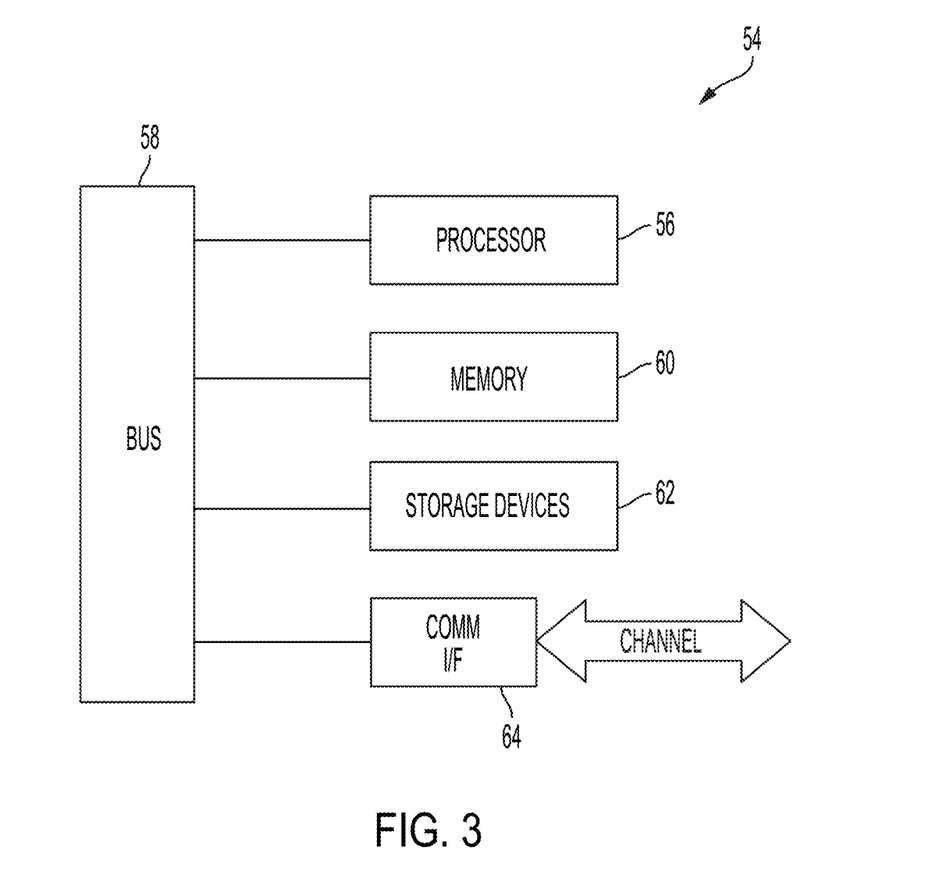
FIG. 3 is a block diagram of a computing module coupled to the profilometer for mapping the topology and for generating sublayer toolpaths along which the additive construction printing assembly will traverse.

FIG. 3 illustrates a computer module 54 configured to provide computing or processing capabilities found within, for example, a mainframe, workstation, server, desktop, laptop or notebook computer, handheld computing device, etc. Module 54 might be available in other electronic devices such as digital cameras, cellular telephones, portable computing devices, modems, routers, WAPs, terminals and other electronic devices, all of which include some form of processing and data storage capability. Module 54 thereby operates to provide signal processing and controller capabilities of signal processor 50 (FIG. 2) in the 3D point cloud data collection as well as other printer assembly operations such as printer assembly position, flowrate and feedback of the control of the quality and quantity of the ensuing bead as it is being constructed on a surface.

Module 54 may include one or more processors 56. Processor 56 might be implemented using a general purpose or special purpose instruction set found in microprocessor execution engines, or other configurable control logic. Processor 56 may be coupled to a bus 58, or other communication medium, to facilitate interaction with other components of computer module 54. Module 54 might also include one or more memory modules 60. Memory 60 might be a random axis memory, or other dynamic memory to store information and instructions to be executed by processor 56. Memory 60 might also include a read only memory or other static storage mechanisms. Module 54 might also include one or more various forms of information storage devices 62, such as media drive and other mechanisms to support fixed or removable storage media. Module 54 might also include a communications interface 64. Communications 64 might be used to allow software and data to be transferred between module 54 and external devices. Examples of communication interface 64 might include wired or wireless communications capabilities, modem, or network interface, a communications support such as a USB port, Bluetooth, or WiFi interface, IR or RF link, optical link, etc. Interface 64 allows any form of data or instructions to be sent to and from module 54 and thus to signal processor 50, as well as controllers, generators, comparators, mixers, drivers, nozzles, valves, pumps, etc. used to additively print beads in succession to and above a foundation surface. Processor 60 of module 54 executes any machine-readable instruction to perform the functionality described herein. A power source might also be included in or coupled to module 54, or components of module 54. The power source may comprise any suitable source of electrical power such as, for example, a battery, capacitor, converter, or local power grid.

Figure 4:
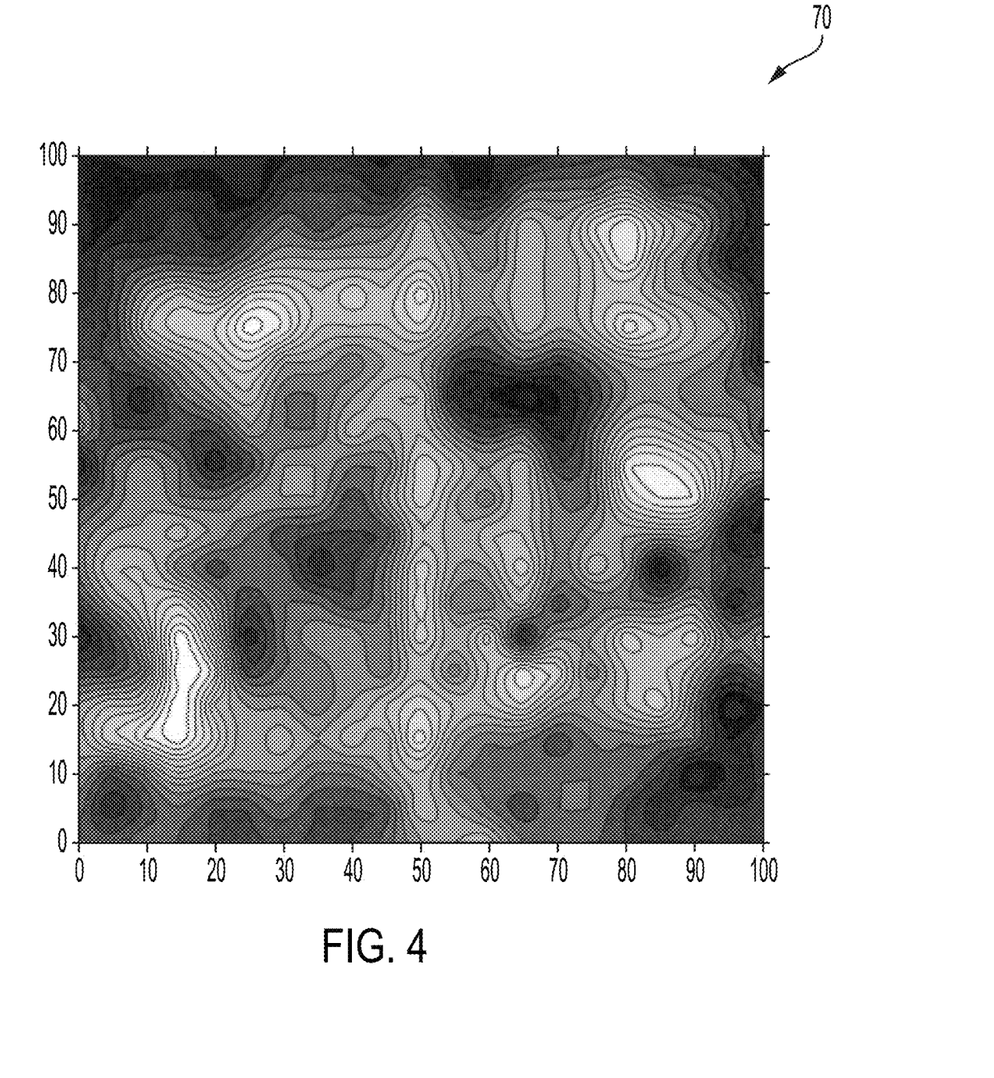
FIG. 4 is an example of a topology mapping taken of a foundation surface.

Referring now FIG. 4, an example of a topology mapping 70 of a foundation surface is shown. Mapping 70 results from scanning a profilometer 44 and streaming point cloud 3D data from the profilometer. The point cloud of data produced from profilometer 44 is in three dimensions, meaning that for every x and y data point, there is a corresponding z data point. Thus, in the example shown, at each x or y data point within the horizontal plane from, e.g., 0 to 100, there will be a corresponding point in the z axis. Each region having the same elevation can therefore be demarcated with a line that would surround that region. In the example shown, different regions demarcated with a line can be symbolized with a different shade. The darker shades might have a lower topography relative to the lighter shades so as to distinguish the regions of peaks and valleys in the surface.

Figure 5:
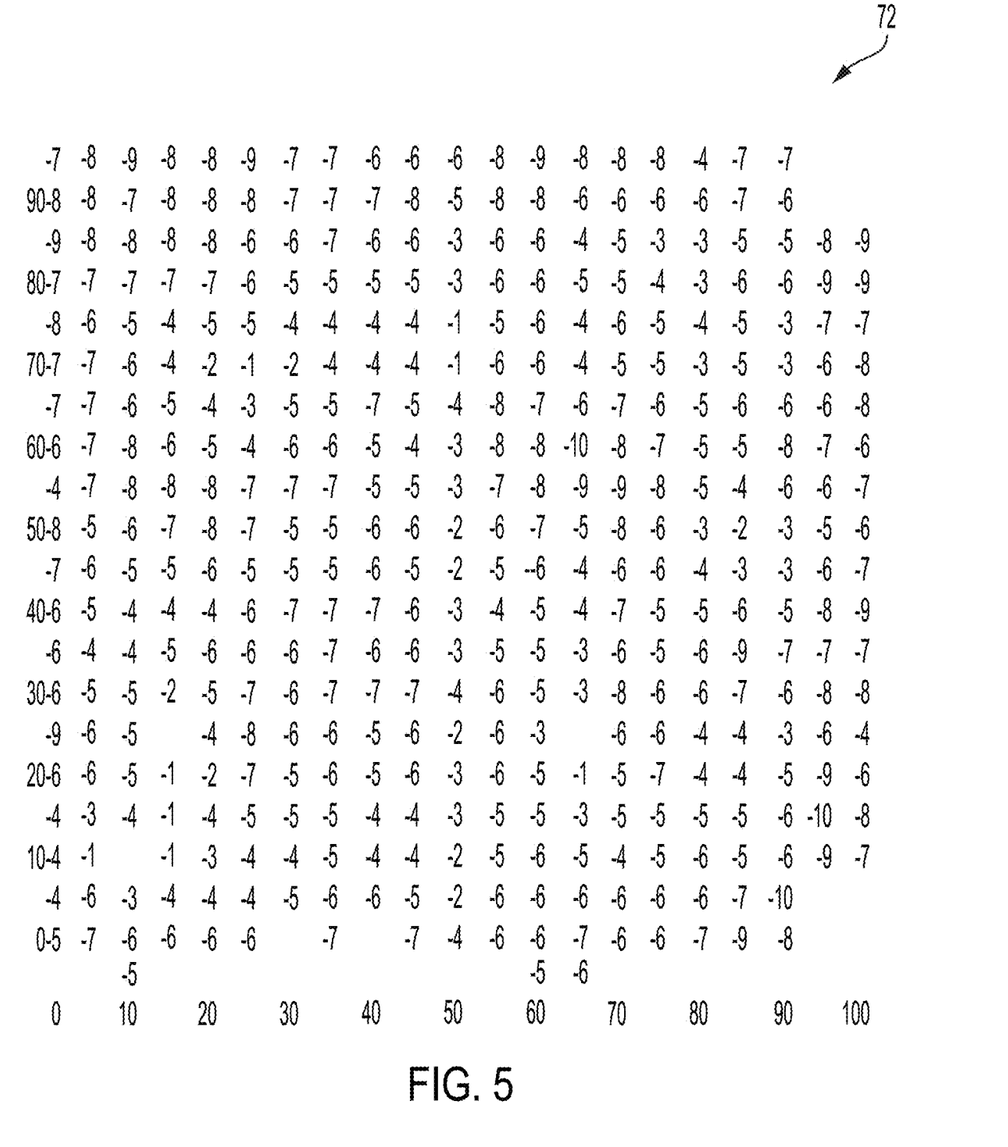
FIG. 5 is the topology map of FIG. 4, shown with different z-axis elevations corresponding to x and y-axis points.
Figure 6:
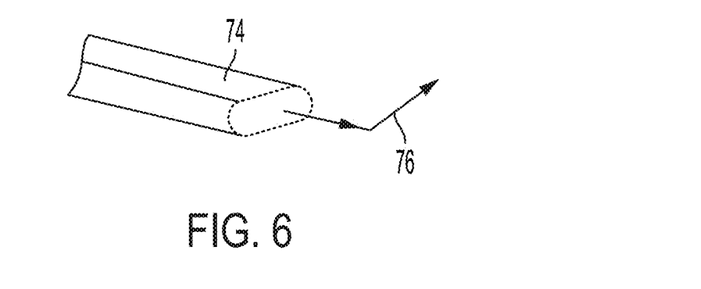
FIG. 6 is an example of a partial elongated bead in perspective view printed along a toolpath.

Turning now to FIG. 5, the point cloud data stream emitted from profilometers 44 can not only be processed by processor 56 to produce a topo map, but also to produce a quantifiable topo map 72. Topo map 72 shown FIG. 5 results from comparing the z-axis dimension at each x and y point to multiple thresholds in a series (i.e., tranches). For example, each z-axis point along the x/y surface can be compared to a reference point. In the example shown, the reference point might be at the center of the x/y surface, and each z-dimension for each x/y point would be compared to that reference point (or z dimension) depending on how many thresholds are exceeded above or below the reference point. For example, if the reference point establishes a zero level, then other z axis points are compared to the zero level to determine if that particular point is one or multiple thresholds or tranches above or below the reference point, as shown. In the example of FIG. 5, one point on the surface could register +10 indicating a very high elevation at that point, whereas another point might be −6, indicating a very low elevation point. FIG. 5 nonetheless illustrates the potential for establishing a reference point, such as a zero level reference point from which all other points in the x/y plane are compared in order to quantify the mapping using techniques known as spline threshold application and the ensuing formation of sublayers and sub tool paths noted herein below. Referring now to FIG. 6, a bead 74 is shown in the perspective view. Bead 74 shown in an oval crossed-section and placed along a toolpath. The toolpath comprises the path taken by the printing assembly of the construction system 10. The toolpath is therefore the print path at which the extruded cementitious building material exits from the outlet of the printing assembly, that toolpath being generated from the CAD constructions stored in memory and executed upon by a cross used control signals for driving the printing assembly.

Figure 7:
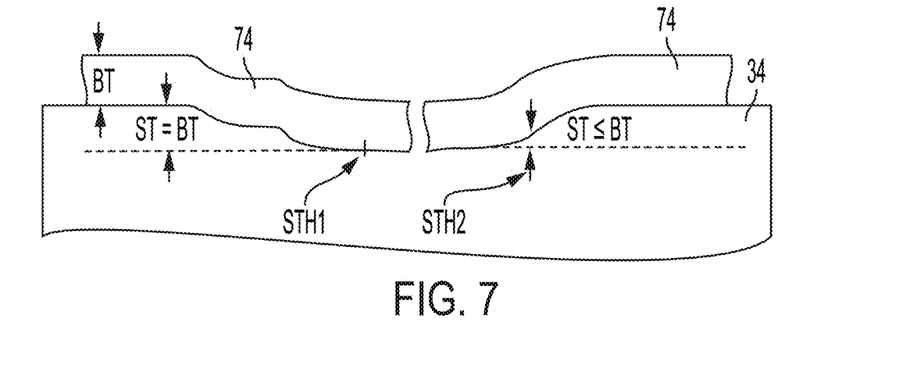
FIG. 7 is a side view of a bead printed on an uneven foundation surface.

According to one example, a toolpath 76 is shown in FIG. 6 that extends in a straight, curved or various right angled directions along the surface. In repeated fashion, beads 74 are additively placed on the surface 34 to form exterior and interior walls of structure 30 (see FIG. 1). Turning now to FIG. 7, a side view of a bead 74 is shown printed on an uneven surface, such as foundation surface 34. As illustrated in partial side view, a foundation surface 34 can be uneven with various peaks and valleys in the upper surface 34. When bead 74 is printed along the toolpath 76 (FIG. 6), the lower surface of bead 74 will conform to the uneven surface 34 leaving the upper surface of bead 74 also uneven.

Figure 8:
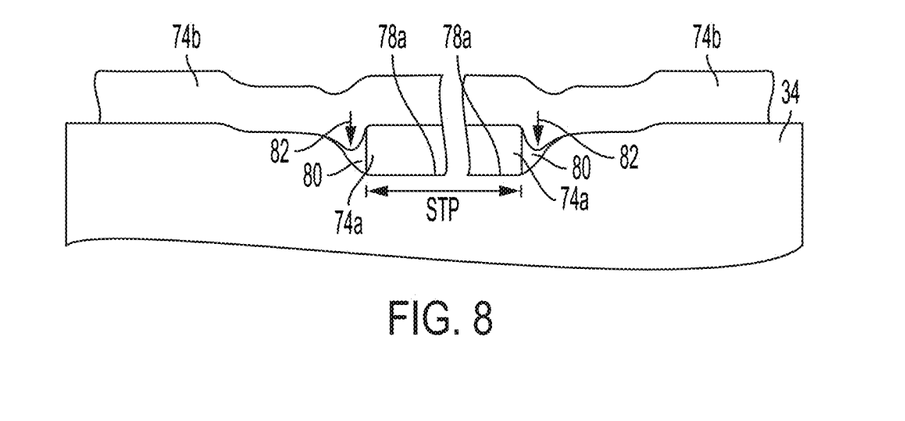
FIG. 8 is a similar side view of the bead printed on a lower level sublayer bead.

Turning to FIG. 8, a similar side view to that of FIG. 7 is shown; however, FIG. 8 illustrates a sublayer bead 74a configured below a layer zero bead 74b. As will be further noted below, layer zero bead 74 is printed along a high point of the foundation surface 34, and therefore along most of the upper regions of surface 34. However, before extruding layer zero bead 74b, sublayer bead 74a is placed exclusively within lower regions, known as sublayers. There may be multiple sublayers, each at different elevations from the other, and therefore there may be multiple sublayer beads 74a partially stacked on top of one another. The purpose behind sublayer bead 74a is to not only provide support for layer zero bead 74b but also to more evenly provide a surface on which bead 74b can be stacked.

Referring FIGS. 7 and 8 in combination, determining where to place sublayer bead 74a is shown. Nozzle mounted on the printing assembly extrudes sublayer bead 74a along only a sub toolpath. The sub toolpath extends across at least a portion of a sublayer 78a. The layer zero bead 74b, conversely, is printed not only along a high point of foundation surface 34, but also along a zero level toolpath that subsumes the sub toolpath labeled STP in FIG. 8. As shown in the combination of FIGS. 7 and 8, sub toolpath (STP) begins and ends when certain height thresholds occur, those height thresholds being when a sublayer recess below a high point of surface 34 is at a certain threshold. In the example of FIGS. 7 and 8, sub toolpath (STP) begins when the surface 34 drops to a one bead thickness (ST=BT). That sublayer thickness at which sub toolpath begins is therefore shown as STH1. As the upper topology begins to rise towards one bead thickness (BT) the sub toolpath will end and so will the sublayer bead 74a at STH2. Thus, while the floor of a sublayer is preferably one bead thickness (BT) below the high point of the foundation surface 34 the sub toolpath (STP) begins and ends at threshold positions STH1 and STH2, respectively, to appropriately place sublayer bead 74a within the lower regions and primarily on the floor of the sublayer 78a. The thresholds STH1 and STH2 can be changed, with the goal of placing sublayer bead 74a approximately one bead thickness (BT) below the high point regions of foundation surface 34. Since sublayer bead 74a is the same bead thickness as layer zero bead 74b, and since the upper surface of sublayer bead 74a is roughly coplanar to the high point of the foundation surface 34, as shown in FIG. 8, layer zero bead 74b exhibits a more even more level upper surface than that shown in FIG. 7 absent a sublayer bead 74a.

While gaps may occur between the lateral opposing side surfaces of the sublayer bead 74a and surface 34 below the high point (i.e. within the valleys or troughs) the flowrate and viscosity of layer zero bead 74b can be modified. For example, to fill the void 80, the printing assembly can be more slowly moved across void 80 or the pumping rate can be increased as the printing assembly is moved across void 80. The result being greater flow within the void of the extruded material as shown by error 82. Increasing the volume of extruded material in the appropriate regions will not only fill void 80 to enhance the structural rigidity of the ensuing wall, but also it will offset any droop or unevenness on the upper surface of the layer zero bead 74b. The goal of using a sublayer bead 74a is, in part, to produce a more even topology whereby the upper surface of sublayer bead 74a is substantially coplanar with a high point of surface 34. Sublayer 74a therefore fills in the valley regions previously determined. Moreover, the valley regions are filled in specifically along a zero level toolpath that is used to form layer zero bead 74b. The sub toolpath can extend collinear with the zero level toolpath, or along a line parallel to but below the zero level toolpath. The sub toolpath could be the same toolpath as the zero level toolpath, but since the sub toolpath is defined as a path in which sublayer bead 74 is formed, a sub toolpath must therefore partially extend along only a portion the zero level toolpath. As will described below, the zero level toolpath is the path taken by the printing assembly to extrude a layer zero bead. Since the layer zero bead is placed along the high point of the foundation surface 34, by definition all lower points below the high point of the foundation surface 34 are filled with one or more stacked sublayer beads 74a, 74b, etc., leaving a zero level toolpath across the entire foundation on which the extruded layer zero bead is placed also across the entire foundation surface, including sublayer beads placed in recesses or sublayers within the surface. The surface on which layer zero bead 74b is printed is therefore relatively even and level, as shown in FIG. 8.

Figure 9:
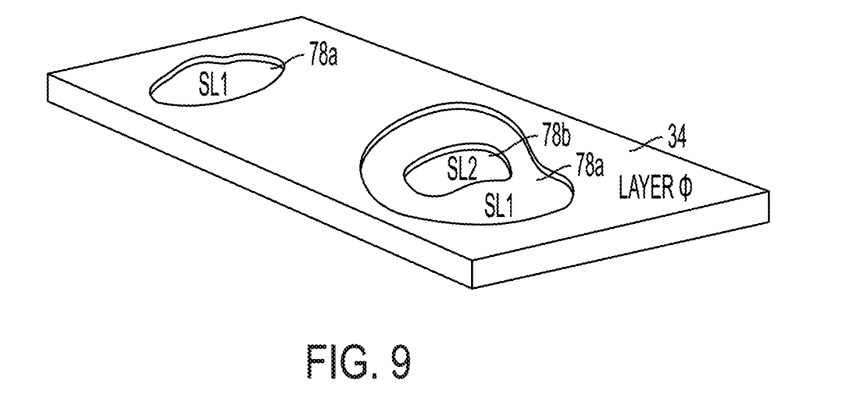
FIG. 9 is a perspective view of a foundation surface example having spline thresholds applied to a mapped topology of the foundation surface to generate sublayers.

Turning now to FIG. 9, a perspective view of a foundation surface 34 is shown. In the example of FIG. 9, two sublayers (SL1 and SL2) are generated. Sublayers are generated from a measured topology. For example, the first sublayer (SL1) 78a has a floor that is recessed within a layer zero. Layer zero comprises a high point or a high elevation in foundation surface 34. The high point represents the highest elevation in the 3D topology extending outward from the x/y plane and in the z direction perpendicular thereto. First sublayer 78a is generated using a spline function, or spline thresholds. Wherever the topology recesses into a valley one spline threshold below the high point, first sublayer 78a is formed at the threshold drop amount. Sublayer 78a therefore has a dimension represented in the point cloud data. The sublayer is also dimensional data in the x/y plane of surface 34. Those dimensions of the outer extents at which one threshold drop occurs is stored in memory later executable by the processor to determine the sub toolpaths. Sublayer 78a will have its own toolpath confined within the stored dimensions so that the ensuing sublayer bead 74a extruded therein will also be confined to the sublayer 78a.

In most instances, there will be multiple sublayers with corresponding stored dimensional data at multiple locations within surface 34. However, for sake of simplicity in the drawings, only two sublayers in three locations with three representative dimensions are shown. It is also understood that there can be multiple sublayers nested within a first sublayer 78a. According to one example, a second sublayer (SL2) 78b can be generated entirely within first sublayer 78a the outer extents of the dimensions of second sublayer 78b must be entirely within the outer extents of first sublayer 78a, and preferably one spline threshold in the z axis below the floor of first sublayer 78a. That spline threshold is preferably one bead thickness. Moreover, as the valleys or recesses within the high point of foundation surface 34 are mapped further and further downward from the high point, multiple sublayers are generated by the processor, one, two, three, etc. bead thickness spline thresholds in the z direction inward into the foundation surface and below the high point of the foundation surface. Therefore, there can be multiple sublayers with lower floor elevations nested within each other and below the high point of surface 34 similar to rings in the inward surface of a relatively flat bottom cone, with each ring being at substantially the same depth.

Figure 10:
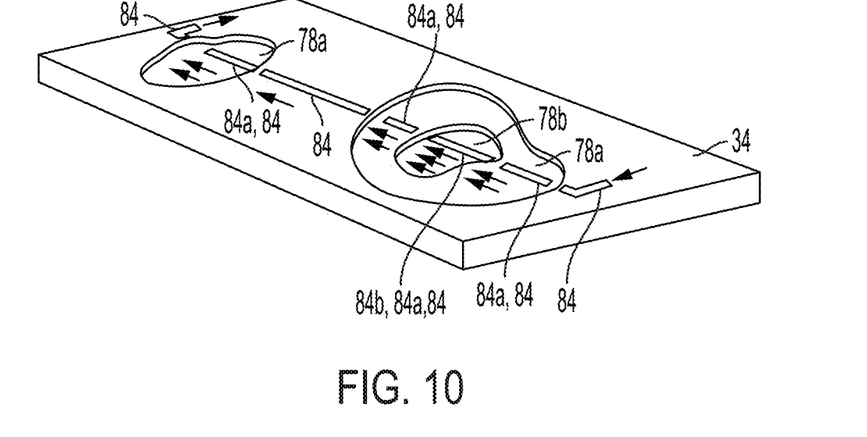
FIG. 10 is a perspective view of the foundation surface sublayers of FIG. 9, showing sublayer toolpaths existing within corresponding sublayers and co-linear with and along the level zero toolpath.

The dimensions of the rings that each have a floor are important to calculate and generate using the splining function since, from those rings or sublayers corresponding toolpaths are also generated. A wall of a building, for example, is produced along a toolpath. FIG. 10 illustrates sub layers 78a and 78b of FIG. 9 with respective first sub toolpath 84a and second sub toolpath 884b. In other words, within first sublayer 78a dimensional data points is a sub toolpath 84a in which the nozzle of the printing assembly will traverse will extruding a sublayer bead 74a. In certain instances, a second sublayer 78b may be dimensionally represented with certain data points of its outer extents within sublayer 78a, as shown near the bottom of FIG. 10. Whenever there are multiple sublayers, there must be multiple sub toolpaths and, as such, extending partially across second sublayer 78b is a second sub toolpath 84b. Accordingly, as shown, the lowermost sublayer 78b has a second sub toolpath 84b. However, since sublayer 78a subsumes the second sublayer 78b, sub toolpath 84a also exists partially across second sublayer 78b. In this fashion, and in accordance with the example of FIG. 10, the lowermost sublayer would have three sub toolpaths as shown. The intermediate layer, or first sublayer 78a would have two sub toolpaths. The second sublayer 78b would have the second sub toolpath, the first sub toolpath and the zero level toolpath 84b, 84a and 84, respectively. Sublayer 78a would have the sub toolpath 84a as well as the zero level toolpath 84.

Toolpaths are represented in the CAD software and stored as coordinates across the x/y/z axis, with the lowermost second sub toolpath 84b instructing the nozzle where to extrude the second sublayer bead along that toolpath. The first sub toolpath 84a instructs the nozzle where to extrude the sublayer bead along that toolpath as well as along the lower, second sub toolpath 84b and across the upper surface of the second sublayer bead. The process continues to the high point taken from layer 34 across which the zero level toolpath 84 extends. Zero level toolpath 84 also extends across the first sub toolpath 84a as well as the second sub toolpath 84b when moving the nozzle so as to extrude the layer zero bead upon the sublayer bead that is stacked upon lower level beads such as the second sublayer bead that is stacked on a third sublayer bead, and so forth.

It is important to note that the various sublayers and corresponding toolpaths are merely data points, or coordinates stored in memory. Those coordinates, when executed upon by a processor cause the printing assembly, and specifically the nozzle to extrude sublayer beads in accordance with those coordinates in succession beginning with the lower most sub toolpath to the zero level toolpath, and upward therefrom. Once the zero level toolpath receives its substantially level and even level zero layer bead, successive beads are stacked upon the layer zero bead using the zero level toolpath. Extruding successive beads upon the layer zero bead and along the zero level toolpath will then produce a resulting wall of a building, taking advantage of the initial bead lower and upper surfaces being fairly flat and even across the entire zero level toolpath so that the resulting wall is relatively even and flat for each successive bead and throughout the resulting wall.

Figure 11:
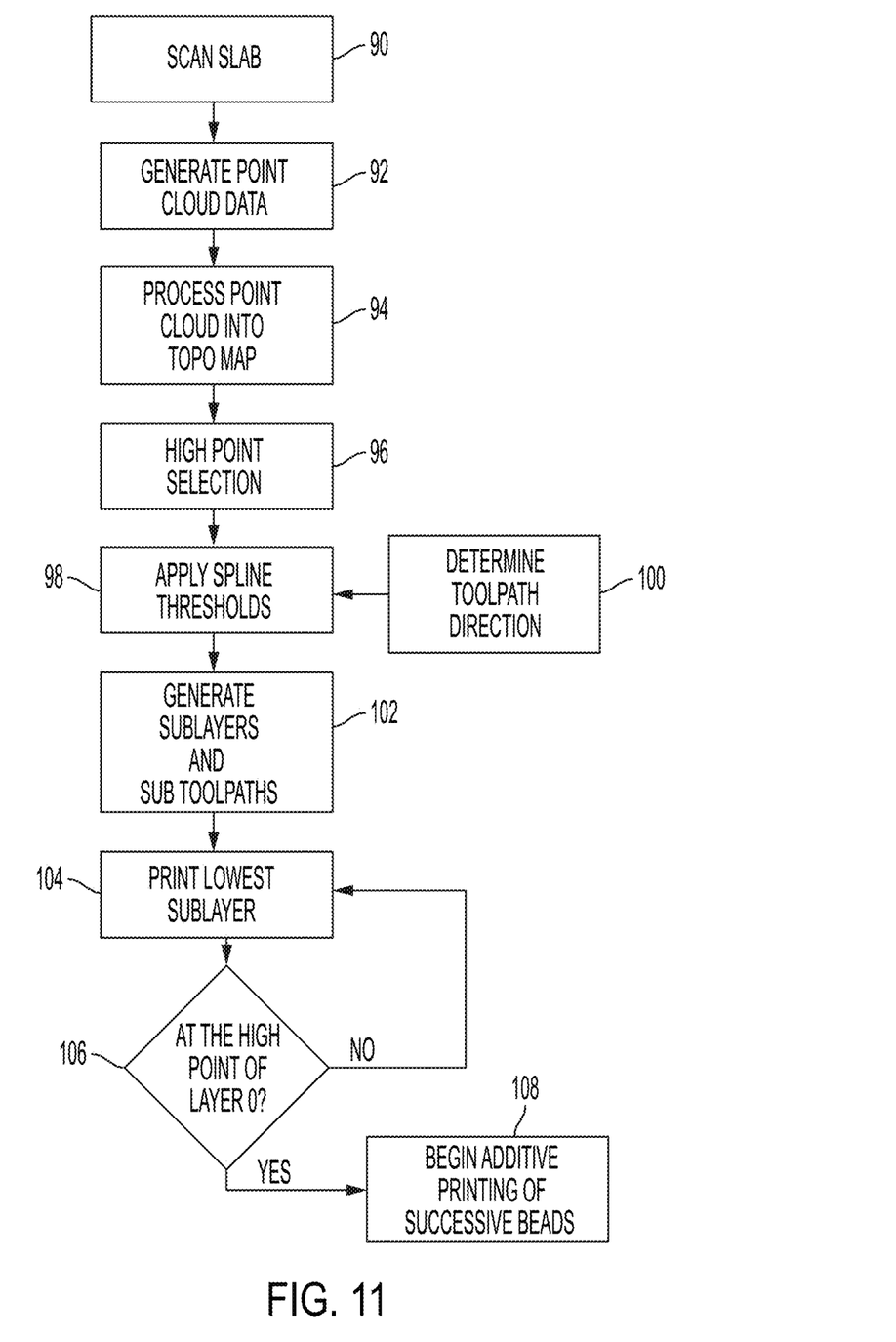
FIG. 11 is a block flow diagram of a method for generating topological mapping, applying spline thresholds, generating sublayers and sublayer toolpaths, and additive 3D printing of the sublayers up to the level zero layer and thereafter applying additive 3D printing on the level zero foundation surface.

Turning now to FIG. 11, a method is shown for constructing a structure. The method begins by scanning a surface, such as a concrete slab 90. Scanning can be accomplished through either contact or noncontact mechanisms. Once scanning of the surface is complete, a point cloud of data can be generated 92. The point cloud of data represents x, y and z coordinates that are then processed into a topological map 94. The topological map is then examined to find the x and y coordinates having the highest point in the z-axis. That high point (i.e. x and y coordinate for a corresponding highest z point for elevation) is then selected and stored 96.

From the high point, topological readings are taken from the topological map data points that are less than the high point and, specifically, one or multiple splined thresholds below the high point 98. The splined thresholds may be applied dependent upon the toolpath direction 100. For example, if the toolpath direction always goes from point a to point b, then the spline threshold near point a maybe greater than the splined threshold nearest point b so as to possibly modify the resulting generated sublayers and sub toolpaths 102. Differing sublayer thresholds (STH1 and STH2) can be different relative to the bead thicknesses as shown in FIGS. 7 and 8. By adjusting the splined thresholds dependent on toolpath direction, a more even sublayer bead or beads can be created.

Since there can be multiple sublayers and corresponding sub toolpaths being generated by the processor, it is important to print the lowest sublayer first 104. For example, if the lowest sublayer is the second sublayer, the extruded material is placed along the second sub toolpath exclusively within the second sublayer before printing the next lowest sublayer (i.e., along the sub toolpath of the sublayer.) As printing continues, beginning at the lowest sublayer, a determination is made whether the last of the sub toolpaths have been printed and whether the next printing is at the high point of the layer zero 106. If not, then the next lowest sublayer is printed. If yes, then it is noted that the layer zero bead has been extruded along the zero level toolpath and therefore the additive printing of successive beads form the wall 108 is undertaken. The sublayer bead(s) are partially extruded across the corresponding sublayer(s) dimensions, and the zero level bead is partially extruded across the surface which contains the high point. The layer zero bead, however, need not be printed across the high point if the zero level tool path directive coordinates do not subsume the high point.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for constructing a building structure, comprising:
   a printing assembly moveably disposed on a gantry above a foundation surface;
   a profilometer mounted on the printing assembly for measuring a three dimensional (3D) topology of the foundation surface to generate a point cloud of data;
   a processor coupled to the profilometer to receive the measured topology and the point cloud of data, and to determine and store an x and a y coordinate having a high point in a z axis coinciding with a high point of the foundation surface, and to generate a sublayer from the measured topology and from the determined x and y coordinates having the high point in the z axis, the high point establishing a zero level reference point against which other z dimensions are compared to, the sublayer being one or multiple splined thresholds below the high point in the z axis, and to also generate a sub toolpath configured to be followed by the printing assembly, the printing assembly being configured to 3D print an extruded cementitious mix along the sub tool path and extending across at least a portion of the sublayer; and a nozzle mounted on the printing assembly to extrude a sublayer bead along only the sub toolpath and below a subsequently extruded layer zero bead placed along the high point of the foundation surface, wherein a top surface of the sublayer bead is extruded to be substantially coplanar with the high point of the foundation surface as the zero level reference point.

2. The system of claim 1, wherein the nozzle is configured to extrude building material including concrete along the sub toolpath, followed by building material extruded along a zero level toolpath.

3. The system of claim 2, wherein the sub toolpath extends co-linear with and partially along the zero level toolpath.

4. The system of claim 2, wherein the processor further generates and stores the zero level toolpath, from which the processor generates the sub toolpath.

5. The system of claim 1, wherein the sublayer bead is parallel to, directly below and adjacent to a portion of the layer zero bead.

6. The system of claim 1, wherein a floor of the sublayer is one bead thickness below the high point of the foundation surface.

7. The system of claim 1, wherein the processor further generates a second sublayer entirely within the sublayer and also further generates a second sub toolpath extending across at least a portion of the second sublayer.

8. The system of claim 7, wherein the nozzle further extrudes a second sublayer bead along only the second sub toolpath and below a subsequently produced said sublayer bead.

9. The system of claim 8, wherein the second sub toolpath extends co-linear with and partially along the sub toolpath.

10. A non-transitory memory medium, comprising:

a processor coupled to the memory medium to receive a measured topology of a foundation surface and a point cloud of data generated from the measured topology, and to determine and store an x and a y coordinate having a high point in a z axis, the high point establishing a zero level reference point against which other z dimensions are compared to, and to generate a sublayer from the measured topology;

a zero level toolpath, established by the zero level reference point, along which a nozzle arranged on a printing assembly is configured to extrude a zero level bead across a surface; and a sub toolpath, extending across at least a portion of the sublayer, along which the nozzle arranged on the printing assembly is configured to 3d print an extruded cementitious mix along the sub toolpath in a sublayer bead one bead thickness below the surface on which the zero level bead is to be extruded, the sub toolpath being configured to be followed by the printing assembly, wherein a top surface of the sublayer bead is extruded to be substantially coplanar with the high point of the foundation surface as the zero level reference point.

11. The non-transitory memory medium of claim 10, wherein the zero level toolpath comprises instructions for moving the nozzle and extruding the zero level bead across the surface.

12. The non-transitory memory medium of claim 11, wherein the sub toolpath comprises instructions for moving the nozzle and extruding the sublayer bead across the sublayer before executing instructions for moving the nozzle and extruding the zero level bead across the surface.

13. The non-transitory memory medium of claim 10, further comprising dimensions of a sublayer entirely within the surface and recessed one bead thickness below the surface.

* * * * *